United States Patent [19]

Higgins

[11] 4,421,451

[45] Dec. 20, 1983

[54] WORKPIECE GRIPPING MECHANISM FOR INDUSTRIAL ROBOTS

[75] Inventor: Bobby L. Higgins, Dallas, Tex.

[73] Assignee: Thermwood Corporation, Dale, Ind.

[21] Appl. No.: 361,858

[22] Filed: Mar. 23, 1982

[51] Int. Cl.³ .................................... B66C 1/42
[52] U.S. Cl. .................................. 414/739; 294/106; 414/744 A; 414/753
[58] Field of Search .................... 414/739, 744 A, 753, 414/621, 1, 2, 4; 294/88, 106; 92/121–125

[56] References Cited

U.S. PATENT DOCUMENTS 3,759,563  9/1973  Kitamura ............................ 414/4 X
4,273,506  6/1981  Thomson et al. .......... 414/744 A X

FOREIGN PATENT DOCUMENTS 2815298  10/1979  Fed. Rep. of Germany ........ 92/121

*Primary Examiner*—Leslie J. Paperner
*Assistant Examiner*—Donald W. Underwood
*Attorney, Agent, or Firm*—Lalos, Leeds, Keegan, Lett & Marsh

[57] ABSTRACT

A workpiece gripping mechanism for an industrial robot is described. A support member having a first jaw member mounted on it for pivotal movement about a first axis is provided. The support assembly and the first jaw assembly define a first rotary fluid-actuated motor operable to pivotally displace a jaw member in the first jaw assembly relative to the support member about the first axis. A second jaw assembly is also mounted on the support member for pivotal movement about the first axis. The support member and the second jaw assembly define a second rotary fluid-actuated motor operable to pivotally displace a jaw member in the second jaw assembly relative to the support member about the first axis whereby the first and second fluid-actuated motors may be operated independently to pivotally displace the jaw members relative to each other for gripping and releasing a workpiece and to displace the jaw members relative to the support member.

16 Claims, 8 Drawing Figures

WORKPIECE GRIPPING MECHANISM FOR INDUSTRIAL ROBOTS

BACKGROUND OF THE INVENTION

This invention relates to industrial robots and more particularly to a gripping mechanism for pick and place type robots. The invention further is particularly adaptable to the types of robots illustrated in U.S. patent applications Ser. Nos. 48,006 filed on June 13, 1979, 127,482 filed on Mar. 5, 1980 and 186,638 filed on Sept. 12, 1980, assigned to the Thermwood Corporation of Dale, Ind.

In the prior art, there has been developed a type of industrial robot for gripping a workpiece at a first location, transporting the workpiece to one or more programmed locations and then positioning and releasing the workpiece at a desired rest position, commonly referred to as a pick and place robot. This type of robot usually is provided with a gripping mechanism which includes a pair of jaws for gripping the workpiece. The jaws normally are adapted to rotate about a transverse or X-axis, roll about a longitudinal or Y-axis and move toward and away from each other for gripping and releasing the workpiece.

Most gripping mechanisms in the prior art, however, have been found to be complicated in design, excessively heavy, thereby adversely affecting the dynamic characteristics of the robot and unduly complicating the programming requirements for the robot control system, expensive to manufacture, and imprecise in performance. It, therefore, has been found to be desirable to provide an improved gripping mechanism for pick and place type industrial robots.

Accordingly, it is a principal object of the present invention to provide an improved gripping mechanism for industrial robots.

Another object of the present invention is to provide an improved gripping mechanism for pick and place type industrial robots.

A further object of the present invention is to provide an improved gripping mechanism for a pick and place type industrial robot wherein the jaws thereof are adapted to operate independently or simultaneously for gripping a workpiece, pivotally displacing the workpiece while it is held by the jaws and releasing the workpiece.

A still further object of the present invention is to provide an improved gripping mechanism for industrial robots which is comparatively simple in design and relatively inexpensive to manufacture.

A further object of the present invention is to provide an improved gripping mechanism for an industrial robot which is comparatively lightweight and adaptable to precision control.

BRIEF DESCRIPTION OF THE DRAWINGS

Other objects and advantages of the present invention will become more apparent to those persons having ordinary skill in the art to which the present invention relates from the following description taken in conjunction with the accompanying drawings wherein.

DETAILED DESCRIPTION OF THE PREFERRED EMBODIMENT

Figure 1:
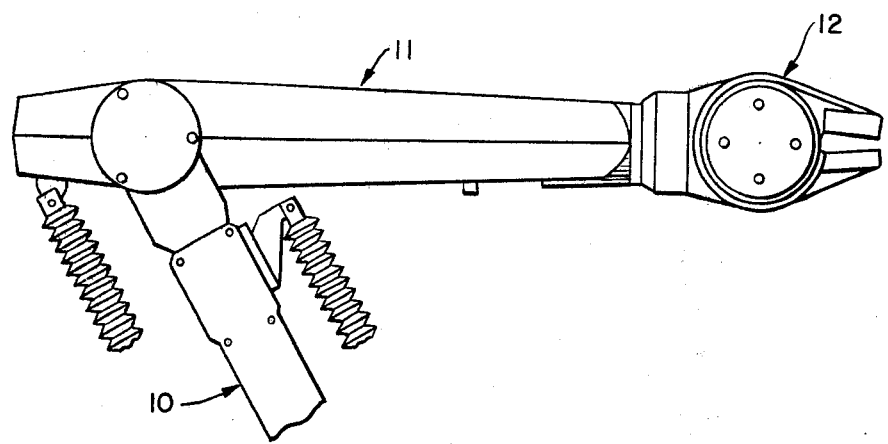
FIG. 1 is a side-elevational view of an upper portion of an industrial robot, illustrating a lower arm portion, an upper arm portion pivotally connected to the upper end of the lower arm portion and a gripping mechanism embodying the present invention mounted on the free end of the upper arm portion of the robot.

Referring to FIG. 1 of the drawings, there is illustrated an upper end of an industrial robot, generally including a lower arm member 10 pivotally mounted at a lower end thereof (not shown) to a base unit, an upper arm 11 pivotally connected to an upper end of lower arm member 10, and a gripping mechanism 12 mounted on the free end of upper arm member 11.

Figure 2:
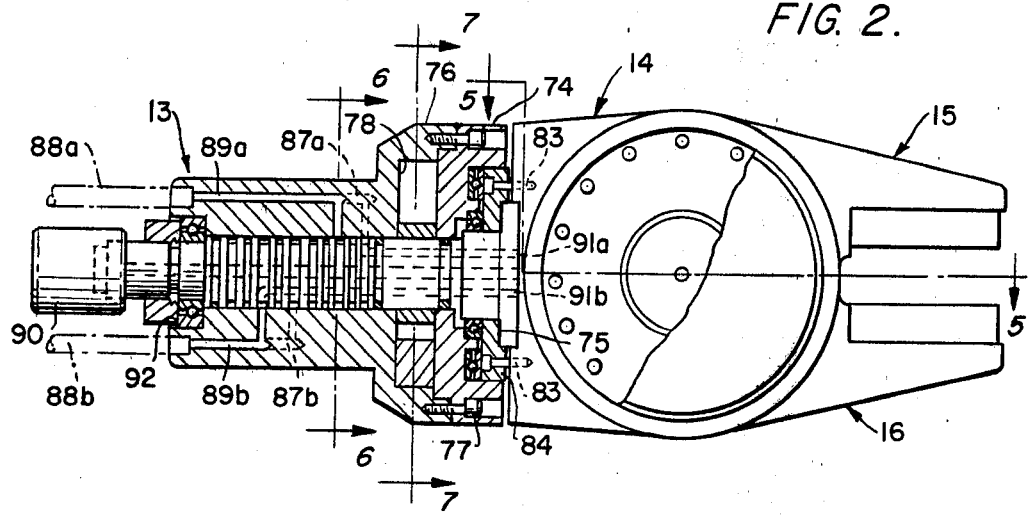
FIG. 2 is an enlarged side-elevational view of the gripping mechanism shown in FIG. 1, illustrating a portion thereof in vertical cross section.
Figure 3:
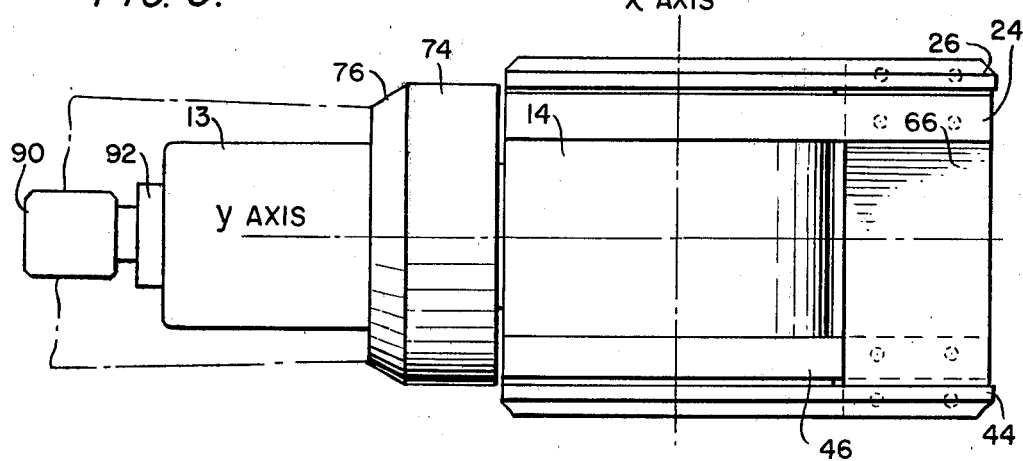
FIG. 3 is a top plan view of the gripping mechanism shown in FIG. 2.

As best illustrated in FIGS. 2 and 3, the gripping mechanism generally comprises a base member 13 rigidly mounted on the free end of upper arm member 11, a support assembly 14 mounted on the base unit for pivotal movement about a longitudinal or Y-axis as shown in FIG. 3 and a pair of upper and lower jaw assemblies 15 and 16 mounted on the support assembly and adapted to pivot about a transverse or X-axis also as shown in FIG. 3.

Figure 4:
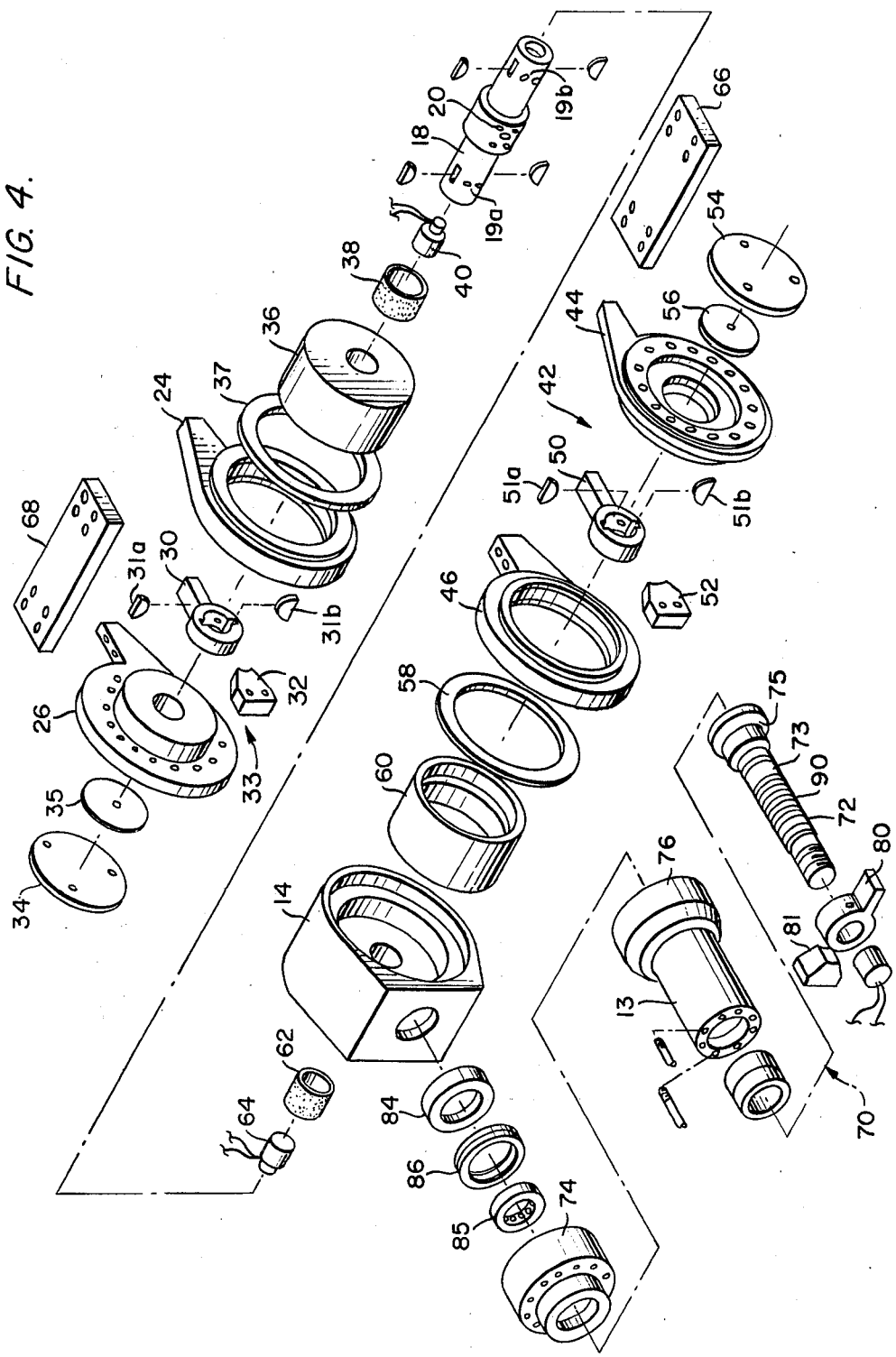
FIG. 4 is a perspective view of the gripping mechanism shown in FIGS. 1 through 3, illustrating the components thereof in exploded relation.

The preferred embodiment of the gripping mechanism according to the invention is illustrated in greater detail in FIGS. 2, 4 and 5, and the following detailed description of the gripping mechanism will be given with reference to those figures.

Figure 5:
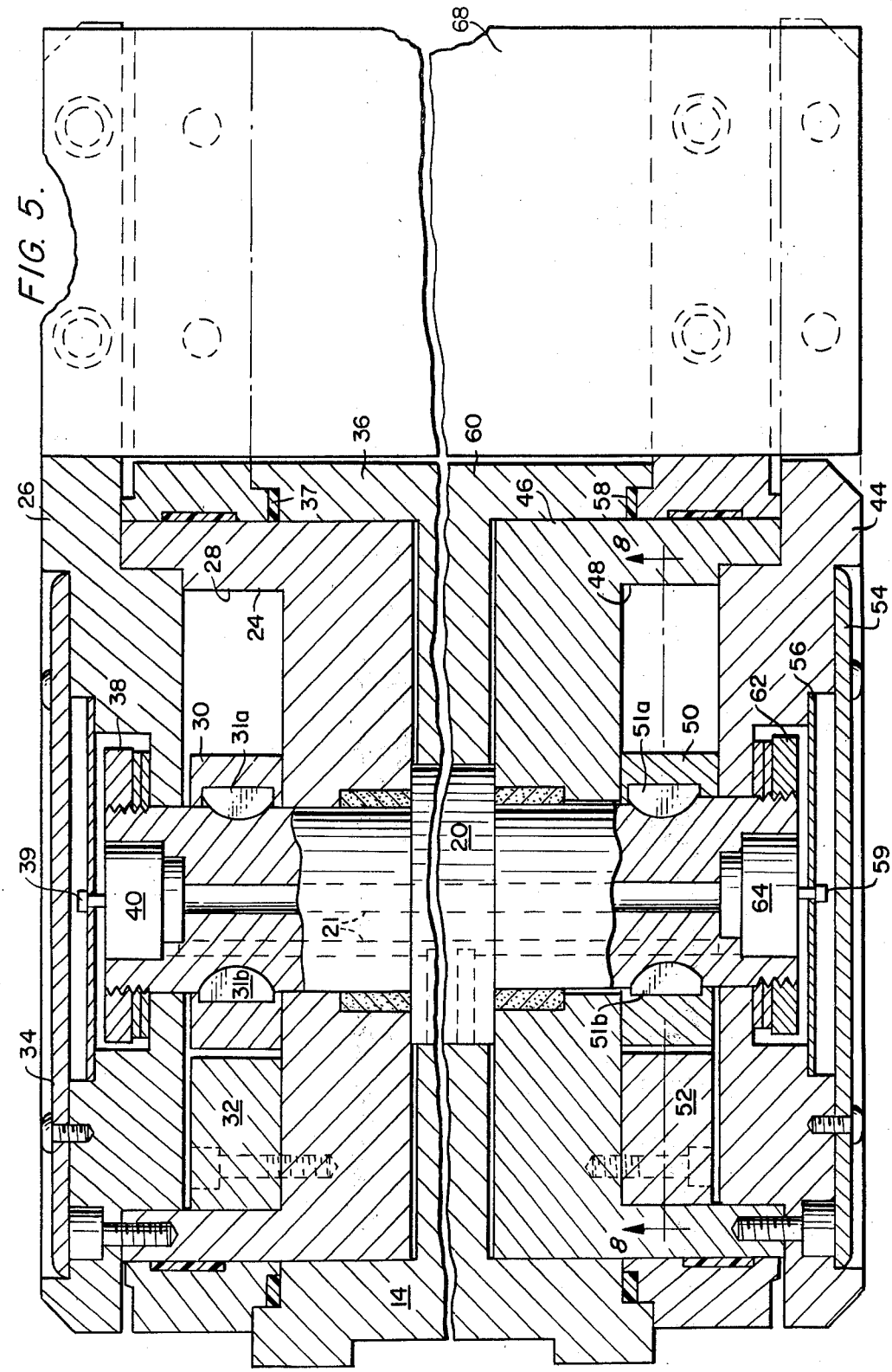
FIG. 5 is an enlarged cross-sectional view taken along Line 5—5 in FIG. 2.
Figure 6:
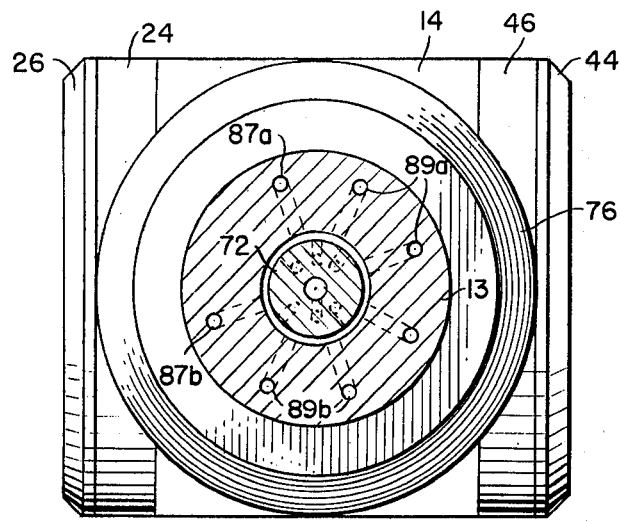
FIG. 6 is an enlarged cross-sectional view taken along Line 6—6 in FIG. 2.

With particular reference to FIG. 5, it will be seen that support member 14 has journaled therethrough a wrist shaft 18 which carries the upper and lower jaw assemblies 15 and 16. Fluid passageways 21 are carried within the wrist shaft and terminate in the inlet and outlet ports generally illustrated at 19a, b and 20. The wrist shaft carries the upper and lower jaw assemblies 15 and 16.

In referring to the exploded view of FIG. 4, the left-hand side of the gripping mechanism operated via ports 19a, contains a jaw member 24 which is driven in a manner to be described in the following to operate the upper jaw assembly 15. A jaw member 26 which functions as an idler is also carried on this assembly for supporting the lower jaw mechanism 16. Jaw member 26 is pivotally mounted for movement about wrist shaft 20 and to pivot relative to jaw member 24 with which it is engaged. The jaw members 24 and 26 when assembled together, as shown in FIG. 5, form therebetween a working chamber 28. Within this chamber a vane type rotor 30 is fixedly mounted via keys 31a and 31b on the wrist shaft 20. A finger stator 32 is attached in a manner best shown in FIG. 5 to the interior of jaw member 24 so as to be within chamber 28. By this means, a fluid motor generally indicated at 33 is formed. End plate 34 and mounting plate 35, attached as shown in FIG. 5, seal the exterior side of the motor assembly 34. The interior side of this motor assembly is sealably mounted on wrist shaft 20 and in support member 14 by means of housing 36, wring seal 37 and bushing 38 assembled in the manner shown in FIG. 5. It will be noted that a potentiometer 40 is mounted within the interior wrist shaft 20 with bushing 38 providing a seal between the wrist shaft interior and the potentiometer at the end thereof and is, in fact, attached to mounting plate 35 which is also attached to jaw member 26. Thus, motion of jaw member 26 is communicated to potentiometer 40 which thereby provides an electrical signal having a value proportional to the motion of that jaw member.

In a similar manner, a fluid motor 42 is formed on the right-hand side of support member 14 of the gripping mechanism. In this case, a jaw member 44 is arranged to be pivotally engaged with a jaw member 46 to form therein a second working chamber 48. As before, a vane rotor 50 is mounted on the right-hand side of wrist shaft 20 by means of keys 51a, and 51b. A finger stator 52 is attached, as shown in FIG. 5, to jaw member 46. End plate 54 and mounting seal 56 are bolted to the exterior side of jaw member 44 to provide a fluid seal for that end of fluid motor 42. Housing 60 and ring seal 58 permit the fluid motor 42 to be sealably mounted in support member 14. Bushing 62 sealably mounts potentiometer 64 in the interior of wrist shaft 20. The end of the potentiometer 64 is similarly riveted at 59 to mounting plate 56 so that this potentiometer receives the motion of jaw member 44.

Workpiece engaging members 66 and 68 are the members which actually clamp the workpiece being gripped by the gripping mechanism, and these are operated by the respective jaw members. In order to completely form upper jaw assemblies 15, the workpiece engaging member 66 is bolted to jaw members 24 and 44. The lower jaw assembly 16 is finally formed by bolting workpiece engaging member 68 to jaw members 26 and 46.

Figure 8:
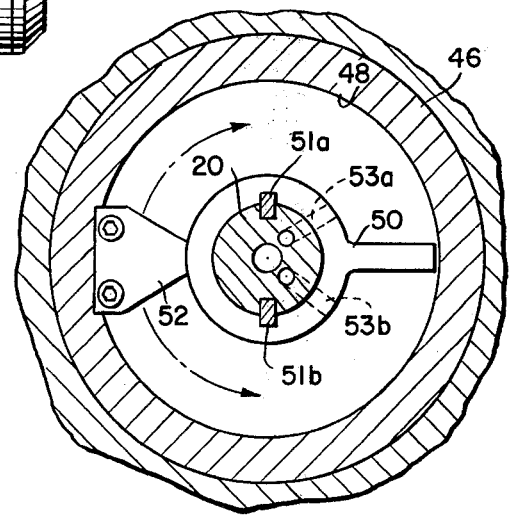
FIG. 8 is a reduced cross-sectional view taken along Line 8—8 in FIG. 5.

By means of the fluid motors 33 and 42, constructed as described hereinabove, it is possible to move the upper and lower jaw assemblies 15 and 16 away from each other or it is possible to selectively operate the individual jaw assemblies so that only one jaw moves relative to the other. In order to permit a better understanding of the construction and operation of such a fluid motor, FIG. 8 provides a cross-sectional view of the motor 42. The passageways 53a, and 53b leading to ports 19b alternatively provide input and output passageways for fluid to operate the motor depending on the direction of operation selected, as indicated by the arrows in FIG. 8. Fluid entering working chamber 48 causes the finger stator 52 which is in sliding engagement with the peripheral surface of fixed rotor 50 to move in the appropriate direction about the surface of the rotor. Since this stator is attached to jaw member 46, that jaw member is caused to rotate about the X-axis in the corresponding direction. Fluid motor 34 is constructed in an identical manner. When the respective rotor-stator assemblies of the fluid motors are operated, both jaw assemblies will be in motion and in dependence on the respective directions of fluid flow the jaw assemblies will either be opening or closing. For example, when the jaws are opening and closing the motors will be caused to operate in opposite directions. It will be seen that by selective control of the fluid flow to the fluid motors the workpiece engaging members can be operated to move toward or away from one another or one selected member can be caused to move either toward or away from the idle member. If, for example, jaw member 24 is driven to move upper workpiece engaging member, the idler jaw member 44, which also supports member 66, is caused to rotate about wrist shaft 20.

In order to provide for motion about the Y-axis a third fluid motor assembly generally indicated at 70 provides for relative motion between the base member 13 and the support assembly 14. This allows the gripping mechanism, as a whole, to be pivoted about this axis. This fluid motor is formed by connecting the flange shaped portion 76 of base member 13, using screws 77, to the wrist housing member 74 in the manner best illustrated in FIG. 2. A working chamber 78 is thereby formed between the opposing surfaces of these two members. A wrist shaft 72 is inserted through the interior of these two members, concentric with their axis, and a vane rotor 80 is fixedly mounted at point 73 on wrist shaft 72 so that it is within the working chamber 78. Finger stator 81 is mounted on the interior wall of portion 76 so as to extend into the interior of working chamber 78 with sliding engagement with rotor 80; by this means, the member 74 is caused to move relative to wrist shaft 72 which is fixedly attached to support assembly 14 in the manner to be described below.

In order to attach wrist shaft 72 to support assembly 14, mounting ring 84 contains an interior annular groove which mates with shoulder 75 at the interior end of the wrist shaft. The mounting ring is then attached to support assembly 14 by means of screws or rivets 83. The member 74 is rotatably engaged with mounting ring 84 through the use of concentric bearings 85 and 86 which are impressed in appropriately formed grooves in the end member 74 as shown in FIG. 2.

Figure 7:
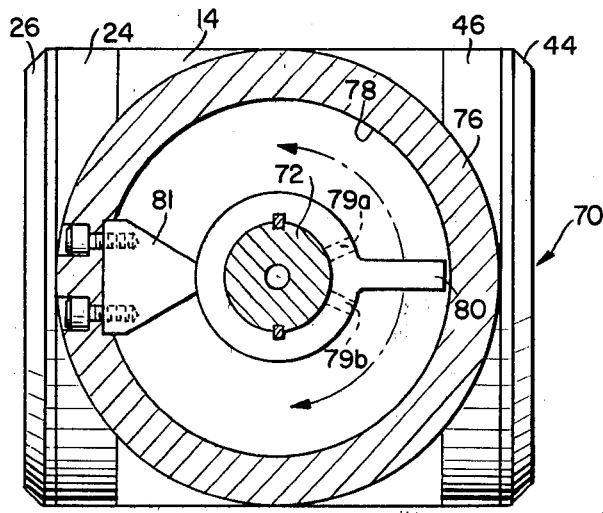
FIG. 7 is an enlarged cross-sectional view taken along Line 7—7 in FIG. 2.

The fluid motor so constructed is best depicted in the cross-sectional view at FIG. 7. In this figure it will be seen that the finger stator is fixedly attached to the outer annular wall of working chamber 78 which is formed by the interior annular surface of portion 76 of base member 13. As before, this finger stator, at its interior end, is in sliding engagement with the surface of rotor 80. Utilizing passageways 79a and 79b fluid is caused to issue into the working chamber 78 to produce movement in the desired direction. Again, by reason of its attachment to the wrist shaft 72, rotor 80 operates as a fixed rotor, while stator 81 moves about the periphery of the rotor thereby causing motion of the member to which it is attached.

In view of the fact that it is necessary to communicate fluid through this assembly to the jaw mechanisms to operate fluid motors 34 and 42, it will be seen that a fluid slip ring means must be provided in view of the relative motion of support assembly 14 with respect to the arm 11 through which the fluid passageways must proceed.

The main fluid inlet and outlet passageways 88a and 88b in arm 11 communicate with mating passageways 89a and 89b in base member 13. These passageways are in fluid communication with appropriate circumferential grooves 90 formed about the periphery of wrist shaft 72. These grooves along with the interior circumferential wall of base member 13 form fluid passageways about the wrist shaft, and these terminate at passageways 91a and 91b which proceed through support assembly 14 to wrist shaft 20. In addition, branch passageways 87a and 87b are provided for supplying fluid to outlets 79a and 79b. The cross-sectional view in FIG.

6 illustrates these passageways proceeding through the wrist member 13, there communicating with the passageways formed on the wrist shaft 72, and the communication of these passageways with the passageways at the end of the wrist shaft.

In order to provide an electrical signal indicative of the direction and magnitude of motion about the Y-axis of the gripping mechanism a potentiometer 92 is attached to the outer end of wrist shaft 20. This outer end extends from base member 13 with bearing 95 providing a seal therebetween.

A preferred embodiment of the invention has been described hereinabove for purposes of permitting and understanding of the principles of the invention. It is to be remembered that the described embodiment is to be considered as being exemplary of those principles, and it is contemplated that those skilled in the art could provide modifications and changes without departing from the spirit and scope of the invention as defined by the appended claims.

I claim:

1. A workpiece gripping mechanism for an industrial robot comprising support means, a first jaw assembly mounted on said support means for pivotal movement about a first axis, said support means and said first jaw assembly having means defining a first rotary fluid-actuated motor operable to pivotally displace said first jaw assembly relative to said support means about said first axis, a second jaw assembly mounted on said support means for pivotal movement about said first axis, said support means and said second jaw assembly having means defining a second rotary fluid-actuated motor operable to pivotally displace said second jaw assembly relative to said support means about said first axis whereby said first and second fluid-actuated motors may be operated independently to pivotally displace said jaw assemblies relative to each other and relative to said support means.

2. A gripping mechanism according to claim 1 including at least one rotary potentiometer operatively mounted on said support means and one of said jaw assemblies for sensing the pivotal displacement of said one jaw assembly relative to said support means.

3. A gripping mechanism according to claim 1 including a base member mountable on an arm of said robot, wherein said support means is mounted on said base member for pivotal movement about a second axis and wherein said base member and said support means include means defining a rotary fluid-actuated motor operable for pivotally displacing said support means relative to said base member about said second axis.

4. A gripping mechanism according to claim 3 including a rotary potentiometer operatively mounted on said base member and said support means for sensing the pivotal displacement of said support means relative to said base member.

5. A gripping mechanism according to claim 3 wherein said support means is provided with fluid passageways communicating with said fluid motors, said base member is provided with fluid passageways communicable with fluid pressure and return lines, and wherein said base member and said support means include means defining a fluid slip ring for intercommunicating the fluid passageways of said base member and said support means.

6. A gripping mechanism according to claim 1 wherein each of said jaw assemblies includes a driven jaw member and an idler jaw member, and wherein each driven jaw member is pivotally mounted on said support means and each of said idler jaw members is pivotally mounted on the driven section of the other of said jaws.

7. A gripping mechanism according to claim 6 wherein each jaw assembly is provided with a workpiece engaging member disposed in opposed relation to a workpiece engaging member of the other of said jaw assemblies.

8. A gripping mechanism according to claim 7 wherein each of said workpiece engaging members consists of a plate secured to the driven and idler jaw members of a jaw assembly.

9. A workpiece gripping mechanism for an industrial robot comprising a support member, a shaft rigidly mounted on said support member, first and second jaw assemblies pivotally mounted on said shaft, each of said jaw assemblies having an annular chamber disposed concentrically relative to said shaft, each of said chambers having a partition element rigidly mounted on said jaw assembly and disposed in sealing engagement with said shaft, and a vane element rigidly mounted on said shaft and disposed in sealing engagement with said jaw assembly, defining a fluid-actuated motor operable for pivoting said jaw assembly relative to said shaft.

10. A gripping mechanism according to claim 9 including at least one rotary potentiometer operatively mounted on said shaft and one of said jaw assemblies for sensing the pivotal displacement of said one jaw assembly relative to said shaft.

11. A gripping mechanism according to claim 9 including a base member mountable on an arm of said robot, wherein said support member is mounted on said base member for pivotal movement about a second axis and wherein said base member and said support member include means defining a rotary fluid-actuated motor operable for pivotally displacing said support member relative to said base member about said second axis.

12. A gripping mechanism according to claim 11 including a rotary potentiometer operatively mounted on said base member and said support member for sensing the pivotal displacement of said support member relative to said base member.

13. A gripping mechanism according to claim 11 wherein said support member is provided with fluid passageways intercommunicating with said fluid motors, said base members provided with fluid passageways communicable with fluid pressure and return lines, and wherein said base member and said support member include means defining a fluid slip ring for intercommunicating the fluid passageways of said base member and said support member.

14. A gripping mechanism according to claim 9 wherein each jaw assembly includes a driven jaw member provided with a fluid motor pivotally mounted on said shaft, and an idler jaw member pivotally mounted on the driven jaw member of the other of said jaw assemblies.

15. A gripping mechanism according to claim 14 wherein each jaw member is provided with a workpiece engaging member disposed in opposed relation to a workpiece engaging member of the other of said jaw members.

16. A gripping mechanism according to claim 8 wherein each of said workpiece engaging members consists of a plate secured to the driven and idler jaw members of a jaw assembly.

* * * * *